United States Patent

McKechnie

[15] 3,699,251
[45] Oct. 17, 1972

[54] AUTOMATIC OPTICAL PROBE FOCUS APPARATUS

[72] Inventor: John C. McKechnie, Maitland, Fla.

[73] Assignee: The United States of America as represented by the Secretary of the Navy

[22] Filed: Sept. 27, 1971

[21] Appl. No.: 184,132

[52] U.S. Cl..............178/7.2, 178/7.92, 178/DIG. 29
[51] Int. Cl.................................................H04n 5/34
[58] Field of Search........178/7.1, 7.2, 7.92, DIG. 29, 178/6.8

[56] References Cited

UNITED STATES PATENTS 3,617,633  11/1971  Barr et al............178/DIG. 29
3,621,136  11/1971  Stanwood...........178/DIG. 29

Primary Examiner—Robert L. Richardson
Attorney—Richard S. Sciascia et al.

[57] ABSTRACT

An automatic focusing device for an optical probe system based upon the phenomenon that maximum frequency of video signal above a selected gray level signal output is determinative of the precise point of the lens focus for the subject distance and in which automatic sampler and comparator means are provided to continuously sample and compare sequential video signal frequency to provide output signals for actuating servo means to adjust the lens system to precise focus.

4 Claims, 9 Drawing Figures

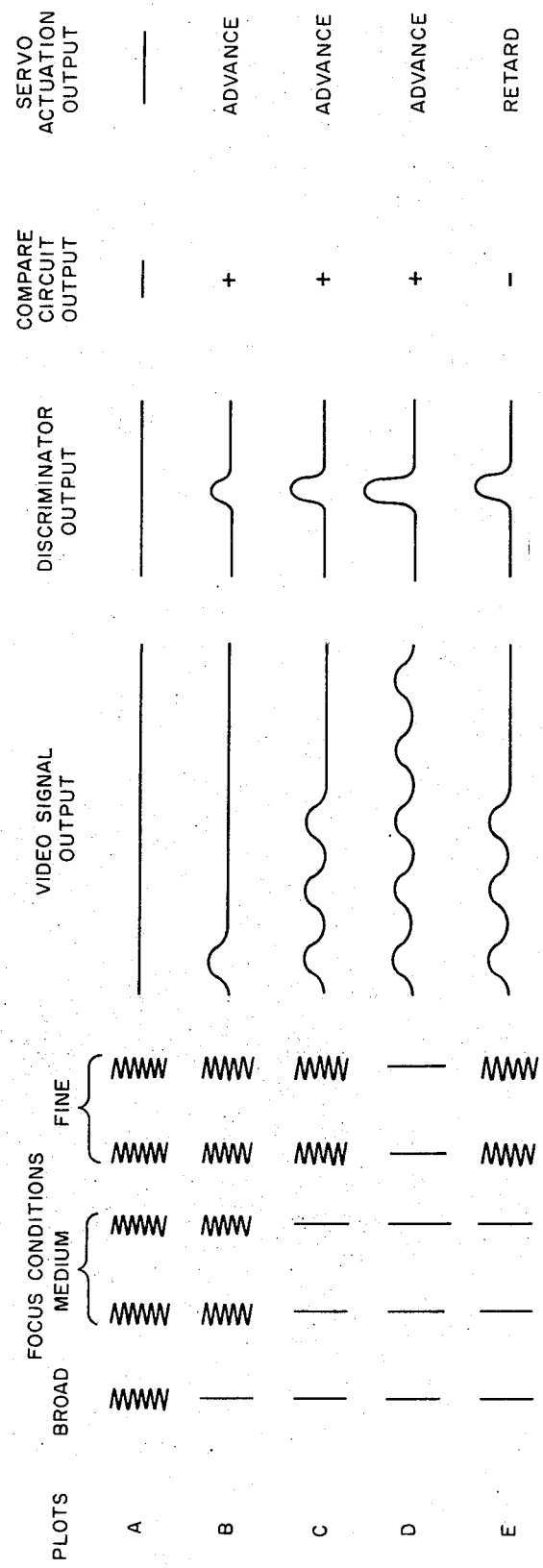
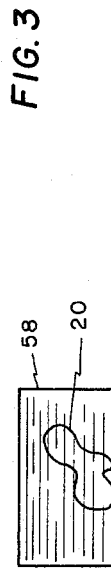
FIG. 3
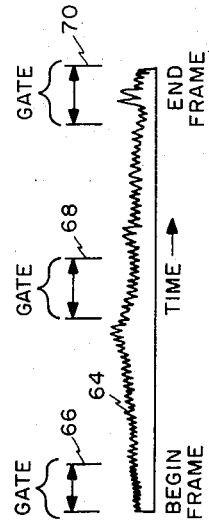
FIG. 5
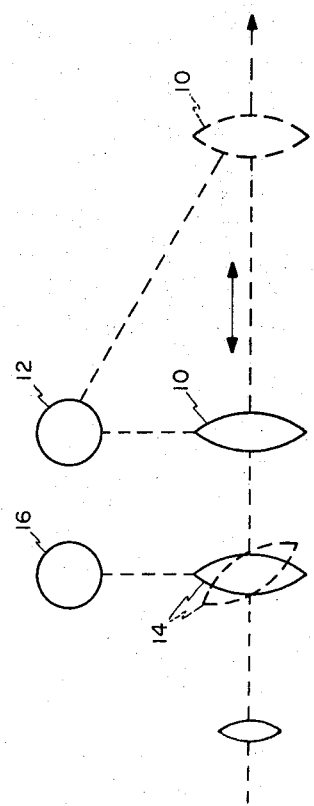
FIG. 4
FIG. 2

3,699,251

AUTOMATIC OPTICAL PROBE FOCUS APPARATUS

BACKGROUND OF THE INVENTION

This invention relates to the field of optics and in particular to automatic focusing means for optical systems including, for example, generalized optical probes, TV optical probe and TV cameras.

In the prior art, focusing of such devices has been obtained by manual means in one instance and by methods for automatic adjustment for a given set of data and equipment based upon empirical formula developed from prior knowledge and measurements of the object plane distance and necessary best point of focus object distance.

SUMMARY OF THE INVENTION

The subject invention is directed to the elimination of the limitations of the above described methods to provide in one aspect a completely automatic focusing system by continuous monitoring of video signals to automatically obtain the widest video signal bandwidth and highest video signal frequency and amplitude, thereby automatically maintaining the optical system image plane in sharpest focus.

DESCRIPTION OF THE DRAWINGS

FIG. 2 is a diagrammatic view of a generalized optical probe having a lens linearly adjustable for best focus distance operated by one servo motor and a Schiemfluig lens whose tilt is adjustable by a second servo motor, FIG. 3 shows exemplary plots A through E of lens focus conditions and the resultant electrical signals utilized to refocus the lens system in accordance with the apparatus of FIG. 1, FIGS. 4 and 5 illustrate respectively a TV line raster superimposed over an image focused in the plane of the raster and the video signal trace curve from a TV camera for one complete frame of TV raster, together with an indication of selective gating of such signal to analyze and compare focus conditions at various portions of the raster.

DESCRIPTION OF THE PREFERRED EMBODIMENT

In accordance with the subject invention, the lens system of an optical probe is adjusted by apparatus to be described wherein amplitude voltage signals representative of image plane spatial frequency response are developed from video input signals and successive samples are obtained and compared to provide actuating signals for adjustment of the lens system.

In FIG. 2 is shown a lens 10 linearly moveable by a servo motor 12 between two positions as shown in full and dotted line to obtain best focus distance. Also as shown in FIG. 2, a lens 14 is angularly rotatable as indicated by full and dotted line by a servo motor 16 to provide best focus of object planes whose normal is tilted from the optical axis line of sight.

Figure 1:
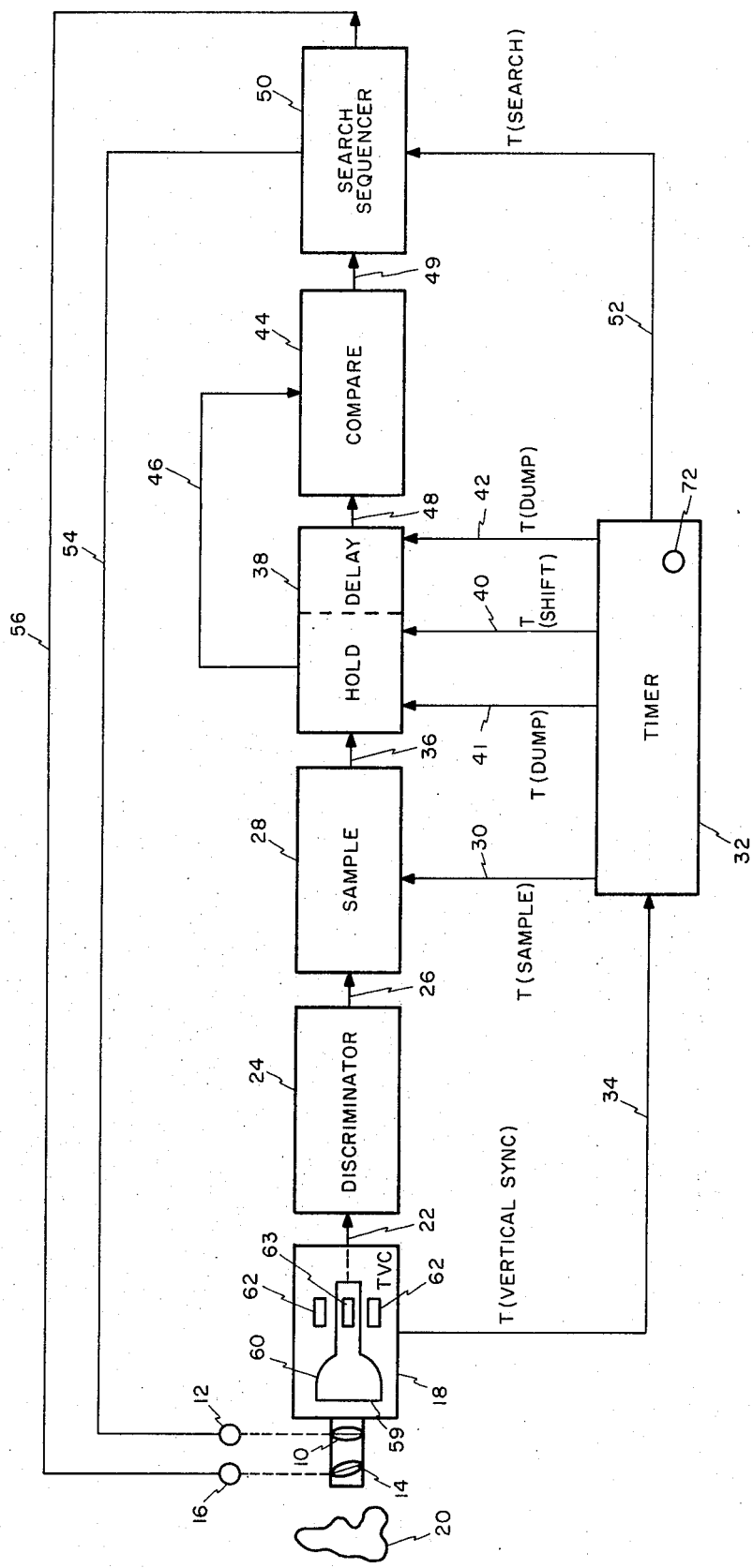
FIG. 1 is a diagrammatic view of apparatus incorporating the invention as applied to a TV camera for angular and linear adjustment of a lens system.

Referring to FIG. 1, there is shown in diagrammatic form apparatus incorporating the invention as applied to a TV camera 18 viewing an object indicated at 20. The linear and angular adjustable lenses 10 and 14 are shown connected to the respective servo motors 12 and 16. The video output electrical signal from the camera 18 is applied on line 22 as input to a discriminator 24 which develops an output signal of amplitude dependent upon the frequency of the video input signal.

Referring to FIG. 3 for the moment, there are shown five exemplary plots A through E of lens focus conditions and the resultant discriminator signal. Each plot shows conditions of broad, medium and fine lines in an object 20 (FIG. 1) viewed. In plot A (FIG. 3) all lines are out of focus as indicated by wavy vertical lines. The video signal output as indicated is substantially zero and the discriminator 24 output is zero. On plot B (FIG. 3), the one broad line is in focus. The video output signal shows one pulse and the discriminator output indicates an amplitude signal output. Plot C indicates a better focus where the broad line and the two medium lines are in focus, the result being a three pulse video signal output and a greater amplitude signal at the discriminator output. Plot D indicates a still better focus where the fine lines are also in focus. The video signal output frequency has now increased to five and the resultant amplitude signal from the discriminator is still larger than in plot C. Plot E indicates that movement of the lens has passed the proper focal distance. The fine lines are out of focus. The video frequency has dropped back to three and the resultant discriminator amplitude signal has been reduced to the amplitude of the plot C condition.

In the apparatus to be described, two sequential sample signals from the discriminator output are compared as to polarity (indicated by the compare circuit output column of FIG. 3) and actuate servo motors (as indicated by the servo actuation column of FIG. 3) to advance and reverse the servo motors 12 and 16 controlling adjustment of the lenses 10 and 14.

More particularly, as shown in FIG. 1, the discriminator 24 provides an output on a line 26 to a sample circuit 28 which is actuated on line 30 from a timer 32. The timer is actuated on a line 34 from the vertical sync of the TV camera 18. Successive samples are passed on a line 36 to a hold and delay circuit 38 also connected to the timer 32 by a shift signal line 40 and dump signal lines 41 and 42. Circuit 38 receives successive sample voltage signals from the sample circuit 28 for storage in the hold portion of the circuit 38. The signal previously held in the hold portion of circuit 38 is shifted to the delay portion of the circuit responsive to an input signal from timer 32 on shift line 40. The signal previously held in the delay portion of circuit 38 is eliminated from circuit 38 by a signal from timer 32 on dump line 42.

The signals in the hold and delay portions of circuit 38 are respectively fed to a compare circuit 44 on respective lines 46 and 48. Circuit 44 compares the relative polarity and amplitude of the hold and delay signals and provides on line 48 to a search sequencer 50 a positive or negative signal representative of the change of amplitude of the two compared signals. The search sequencer 50 operates responsive to a signal from the timer 32 on a line 52 to provide an output signal on a line 54 to servo 12 for adjustment of lens 10 and sequentially on a line 56 to servo 16 for adjustment of lens 14. In this manner the optimum focus of lenses 10 and 14 are obtained automatically for proper focus of the TV camera 18 on the object 20.

Referring to FIG. 3, the column compare circuit output indicates the polarity output of comparing a sequence of pairs of signals in the hold and delay portions of circuit 38. The column servo actuation indicates the resulting action on the servo motors. Thus, comparing signals per plots A and B, with A in hold and B in delay the result is a positive voltage signal which advances the servo motors. Comparison of the next set of signals, plots B and C, also shows a positive output and a servo advance. Comparison of plots C and D shows a positive signal calling for a farther servo advance. However, comparing plots D and E shows the proper focus point has been passed and the negative polarity signal results in a retard action of the servo as a proper adjustment toward proper focus. The search sequencer 50 is arranged to operate for a time on linear adjustment of lens 10 to provide proper focus and then for a time on angular adjustment of lens 14 to provide proper focus. This cycle of actions is continuous to maintain both lenses in proper focus adjustment. It is also to be understood that the lens system, while shown as two separate lenses, could be made of one lens adjustable sequentially for linear and angular adjustment.

FIGS. 4 and 5 are provided to aid in understanding the operation of the timer 32 in extracting time sample spatial frequency signals from the discriminator 24 for selected areas of the image being scanned within one scan frame. Thus, FIG. 4 shows a TV line raster 58 superimposed over the image 20 focused in the plane of the raster on the face 59 of the TV camera tube 60. Numerals 62 and 63 indicate the horizontal and vertical detection coils. The plane of the raster may be referred to as the image plane. Each time a TV raster scan line intercepts an edge of the image vertical excursions of the video signal occur. FIG. 5 shows the video signal 64 from the TV camera 18 for one complete frame of the TV raster. The changing video signal levels represent changes in the optical system gray scale and discrete edges in the image. In FIG. 5, time gates 66, 68, 70 are shown to indicate a time sampling of various portions of the image. A TV raster normally scans the image in an orderly manner, for example from bottom to top, two fields per frame interlaced. By selecting only a portion of the scene image video with a synchronized time gate, provided by adjustment of the timer 32 as indicated by the control knob 72, video signals representing sharpness of focus of different portions of the image 20 can be chosen as indicated at time gates 66, 68, and 70 of FIG. 5. Thus, for example, the lower portion, the mid area, and the upper portion of the scene may be selectively chosen for sharpest focus. The timer input 52 is included in the search sequencer circuit 50 to allow periodic refocusing at suitable time intervals compared to the frame rate or moving objects into and out of the scene. For example, a sample would be taken providing electrical outputs for automatic focusing of the lens system. Then a new sample would taken and the lens system automatically refocused by the sequential output signals. Comparative samples are taken close enough in time so a major portion of the scene does not change.

Figure 6:
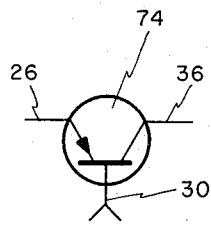
FIG. 6 is a schematic diagram of one suitable circuit for the sample circuit in FIG. 1.
Figure 7:
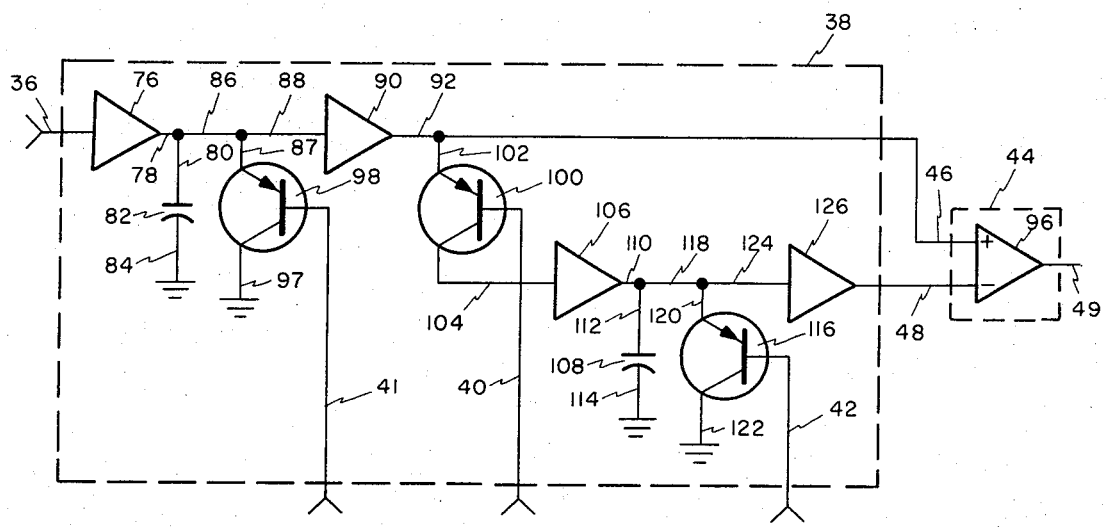
FIG. 7 is a schematic diagram of a suitable circuit for the hold and delay and the compare circuit of FIG. 1.
Figure 8:
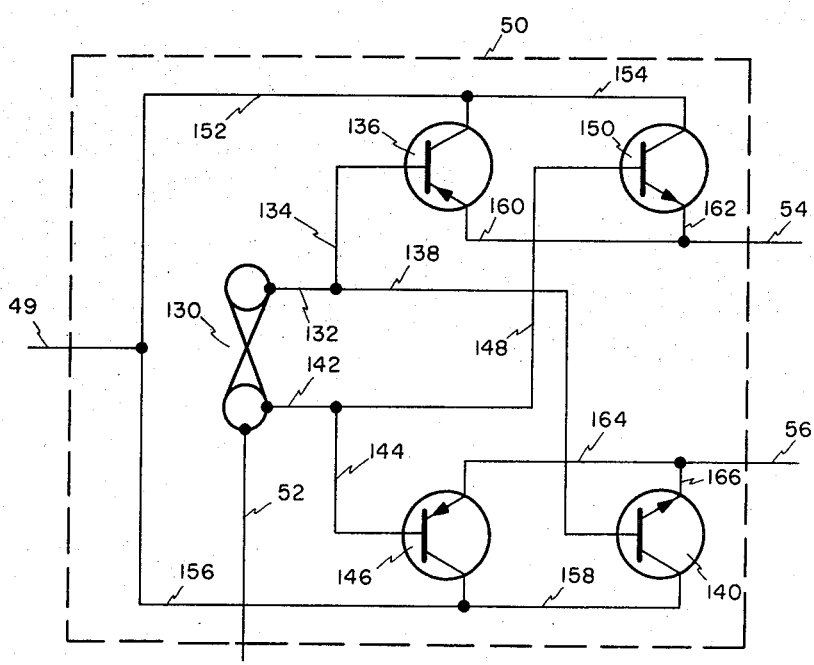
FIG. 8 is a schematic diagram of a search sequencer circuit for search sequencers of FIG. 1.

FIGS. 6, 7, and 8 illustrate details of suitable circuitry for the circuits 28, 38, 44, and 50 of FIG. 1.

FIG. 6 shows a simplified sample circuit utilizing a transistor 74 actuated from the timer 32 to receive an input on line 26 from discriminator 24 and provide an output on line 36 to the hold and delay circuit 38 responsive to an actuating signal on line 30 from timer 32.

FIG. 7 illustrates a suitable circuit for the hold and delay circuit 38 and a suitable circuit for the comparator 44. As shown in FIG. 7, the sample signal is brought in on line 36 and passed through an isolation amplifier 76 and lines 78 and 80 to charge a capacitor 82, the other side of which is connected to ground indicated by a line 84. The sample signal now in the hold portion of circuit 38 is transmitted via lines 86 and 88, isolation amplifier 93 and lines 92 and 46 to one input side of a differential transformer 96 of the compare circuit 44. A transistor 98 is connected by lines 87 and 97 between line 86 and ground indicated for actuation by the timer 32 via dump line 41, as will be hereinafter described. Another transistor 100 is connected to line 92 by line 102 and via a shift line 104 and an isolation amplifier 106 to the delay portion of the circuit. Transistor 100 is actuated from the timer 32 via line 40 to shift a signal from the hold portion of the circuit 38 to the delay portion of the circuit. The delay portion of the circuit includes a capacitor 108 connected to amplifier 106 via lines 110 and 112 and to ground indicated via a line 114. The circuit also includes a transistor 116 connected to line 110 via lines 118 and 120 and to ground indicated by a line 122. Transistor 116 is actuated via dump line 42 from the timer 32 to dump a signal from the delay circuit to provide for storing a new signal transferred therein by the shift transistor 116. The output of the delay circuit is connected to the other side of the differential transformer via a line 124, an isolation amplifier 126 and line 48. The output of the differential amplifier is positive or negative, dependent upon its comparison of the signals stored in the hold and delay portions of circuit 38.

Referring to FIG. 8, there is shown one suitable form of search sequence circuit. In FIG. 8, numeral 130 indicates a bistable multivibrator which is connected on one output side via lines 132 and 134 to the base of a transistor 136 and by lines 132 and 138 to the base of a transistor 140. The other output of the multivibrator 130 is connected by lines 142 and 144 to the base of a transistor 146 and by lines 142 and 148 to the base of a transistor 150. The sequence searcher is actuated by timer 32 via line 52 to reverse the condition of the bistable multivibrator 130. Signal input to the search sequencer 50 is provided on line 49, the signal being carried on lines 152 and 154 to the respective collectors of transistors 136 and 150 and by lines 156 and 158 to the respective emitters of transistors 146 and 140. The emitters of transistors 136 and 150 are connected by lines 160 and 162 to the output line 54 connected to energize servo motor 12. The collectors of transistors 146 and 140 are connected by lines 164 and 166 to the output line 56 serving the servomotor 16. Transistors 150 and 140 are PNP and transistors 146 and 136 are NPN such that each side of the circuit is served by a pair of transistors including an NPN and PNP in parallel.

In FIG. 7, the output on line 49 is positive or negative, depending upon the relative polarity of signals in the hold and delay circuits of the device 38. In FIG. 8, the positive or negative input signal on line 49 effects the direction of rotation of the servos 12 and 16 for advancing or retarding the lens focus positions. The bistable multivibrator is conditioned by successive inputs on line 52 to provide in one state an output on line 54 for linear adjustment of lens 10 and in the opposite state, an output on line 56 for tilt adjustment of lens 14.

Thus, in operation with the multivibrator conditioned for a positive output on line 132 and negative output on line 142, a positive input signal on input line 49 provides a positive output on line 54 to its associated servo 12. This signal passes through NPN transistor 136 which is biased to on condition by the positive input to its base from the output line 132 of multivibrator 130. PNP transistor 150 is inoperative because the signal to its collector from line 49 is positive. PNP transistor 140 remains inoperative because it is receiving a positive bias from lines 132 and 138. NPN transistor 146 remains inoperative because it is receiving a negative bias via lines 142 and 144. For the same condition of multivibrator 130 and with a negative signal on input line 49, a negative output signal is provided on line 54 via transistor 150 to retard servo 12. The remaining transistors are conditioned to inoperative state. Under the opposite condition of multivibrator 130, i.e., a negative output on line 132 and a positive output on line 142, the results are as follows. A positive signal on line 49 operates NPN transistor 146 to provide a positive output on line 56 and a negative input on line 49 operates PNP transistor 140 to provide a negative output on line 56.

Considering the operation of the overall system as per FIG. 1, the TV camera 18 scans the image 20 to produce a video signal output on line 22 corresponding to spatial frequency. The discriminator 24 transforms the video frequency signal to a variable amplitude signal which is time sampled by the sampler circuit 28 responsive to actuation of the sample circuit from input line 30 and passed to the hold portion of circuit 38. Thereafter the sample signal stored in the hold portion of circuit 38 is transferred to the delay portion of circuit 38 by an input signal from timer 32 on shift line 40. An input signal from timer 32 on dump line 41 then clears the hold portion of circuit 38 for admission of a new sample signal. The two sample signals, one in hold and the other in delay, of circuit 38 are then passed on lines 46 and 48 to the compare circuit 44 which produces an output on line 49 to the search sequencer circuit 50. This output is positive or negative as determined by the compare circuit 44, and is passed on line 54 to servo 12 for linear adjustment of lens 10 or on line 56 to servo 16 for angular adjustment of lens 14. Timer 32 via line 52 provides successive signals for holding the output of search sequencer 50 on line 54 for a period of time sufficient to pass a series of compare signals to servo 12 adequate to provide linear adjustment of lens 12, and then timer 32 passes another signal via line 52 to the search sequencer 50 to change the condition of its multivibrator to actuate line 56 for a period of time necessary to provide angular forms of lens 14 via servo 16. The process is then recycled. Dump line 42 is actuated by timer 32 to clear the delay circuit for acceptance of the signal in the hold portion of circuit 38 responsive to actuation of shift line 40 from timer 32. Line 40 provides a dump signal from timer 32 to clear hold circuit 38 for acceptance of a new sample signal from sample circuit 28. As previously described, the timer 32 is manually adjustable by knob 72 to select time gates as indicated in FIG. 5 to select video signals representing sharpness of focus of different portions of the image 20, such as the lower portion, the mid area and the upper portion of the scene.

Figure 9:
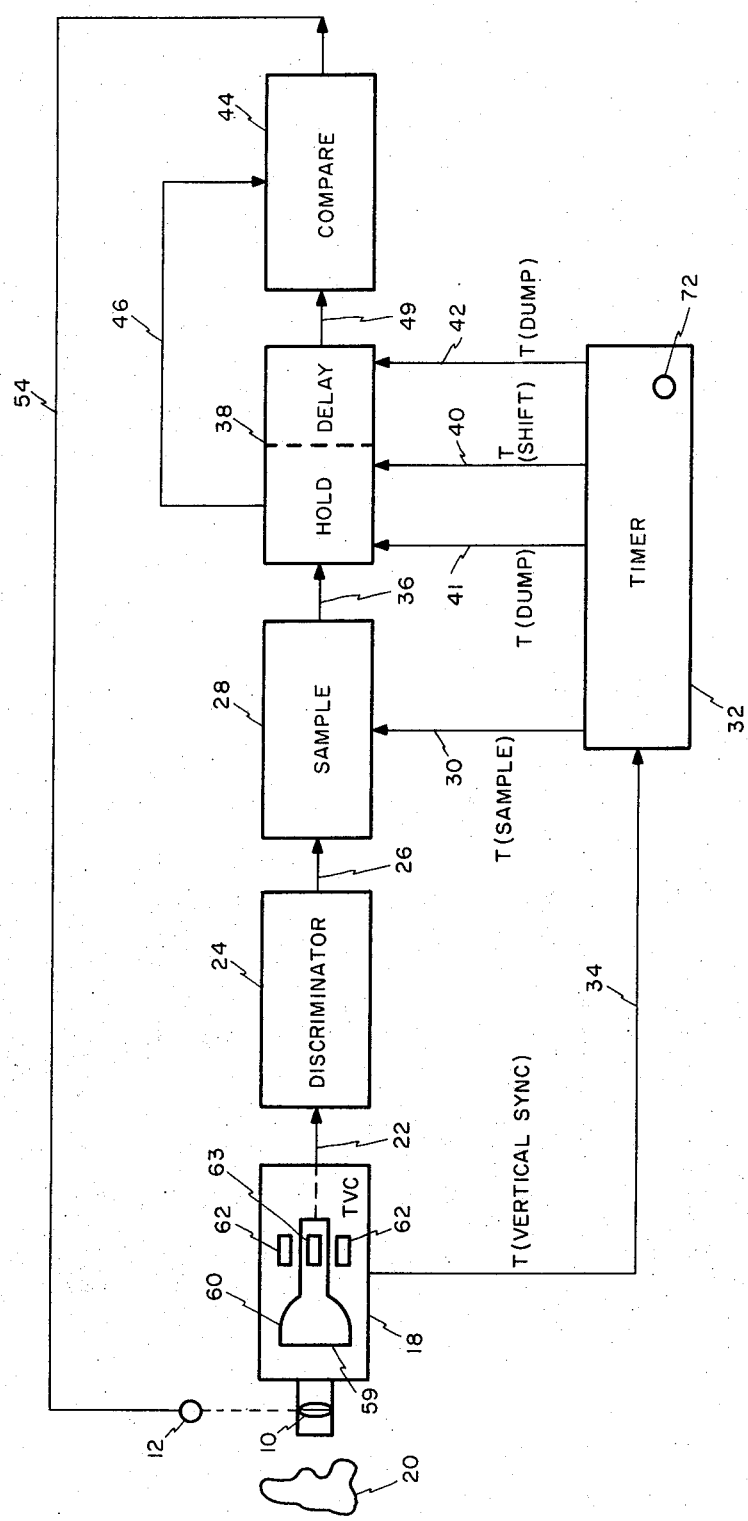
FIG. 9 is a block diagram of apparatus incorporating the invention as applied to a TV camera wherever only one lens adjustment is required.

FIG. 9 shows a further aspect of applicant's invention as applied to a single lens optical probe system. In this arrangement as compared to the arrangement of FIG. 1, servo motor 16 and lens 14 having been eliminated, there is no requirement for the search sequencer 50 and its associated timer line 52 and servo line 56. Compare output line 54 is connected to the servo 12.

What is claimed is:

1. In an optical probe system including means defining an image plane, a lens means for focusing a scene onto said image plane, an image scanning and electro-optic detection means for scanning said image plane to produce light signals and convert said light signals to electro-video signals, apparatus for automatically focusing said optical system comprising:

a. discriminator circuit means for receiving said electrovideo signals and converting them to amplitude electrical signals proportional to spatial video frequency,
   b. timer means connected for actuation by scanning means and providing output signals for sample, shift, dump and search sequence,
   c. a sampler circuit connected for actuation by said timer and for receiving a band sample of said amplitude electrical signals depending in width upon a time adjustment of said sample output of said timer,
   d. circuit means having a hold and delay portion and signal shift means, said circuit being connected to said sampler circuit and to the sample, shift and dump outputs of said timer means to receive successive inputs from said sample circuit into said hold portion and to shift signals previously stored in said hold portion to said delay portion for simultaneous comparison of polarity of the signals stored in hold and delay,
   e. a compare circuit connected to receive respective inputs from said hold and delay portions of said hold and delay circuit and provide an output signal of polarity dependent upon the relative amplitudes of said input signals,
   f. servo means connected to the output of said compare circuit to provide automatic focus adjustment to said lens means when actuated from said compare circuit, and g. a search sequence means connected for actuation from the sequence output of said timer to alternately actuate said linear and angular adjustment servos for selectively adjustable time periods.

2. Apparatus according to claim 1, wherein
a. said servo means includes a first servo for linear adjustment and a second servo for angular adjustment of said lens means,
b. said timer having a sequence signal output, and
c. a search sequence means connected for actuation from said sequence signal output of said timer to alternately actuate said linear and angular adjustment servos for selectively adjustable time periods.

3. Apparatus according to claim 2, wherein
a. said timer includes a manually operated control knob for varying the time period of the sample signal output to select sequentially desired portions of the scene image such as the lower portion, mid area, or upper portion of the scene to provide sharpest focus of that selected area.

4. Apparatus according to claim 1, wherein
a. said timer includes a manually operated control knob for varying the time period of the sample signal output to select sequentially desired portions of the scene image such as the lower portion, mid area, or upper portion of the scene to provide sharpest focus of that selected area.

* * * * *